United States Patent
Kuo et al.

(10) Patent No.: US 11,272,397 B2
(45) Date of Patent: Mar. 8, 2022

(54) FLEXIBLE NETWORK CONTROL OF UPLINK DATA DUPLICATION

(71) Applicant: Nokia Technologies Oy, Espoo (FI)

(72) Inventors: Ping-Heng Kuo, London (GB); Daniela Laselva, Klarup (DK); Dawid Koziol, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/891,897

(22) Filed: Jun. 3, 2020

(65) Prior Publication Data
US 2021/0014728 A1 Jan. 14, 2021

Related U.S. Application Data

(60) Provisional application No. 62/873,249, filed on Jul. 12, 2019.

(51) Int. Cl.
*H04W 4/00* (2018.01)
*H04W 28/06* (2009.01)
*H04B 17/318* (2015.01)
*H04B 17/336* (2015.01)
*H04W 28/02* (2009.01)
*H04W 80/02* (2009.01)

(52) U.S. Cl.
CPC .......... *H04W 28/06* (2013.01); *H04B 17/318* (2015.01); *H04B 17/336* (2015.01); *H04W 28/0263* (2013.01); *H04W 80/02* (2013.01)

(58) Field of Classification Search
None
See application file for complete search history.

(56) References Cited

U.S. PATENT DOCUMENTS

| 10,143,002 | B2* | 11/2018 | Madan | H04W 72/1231 |
| 2008/0064390 | A1* | 3/2008 | Kim | H04W 60/00 455/425 |
| 2016/0212721 | A1* | 7/2016 | Sheng | H04W 76/14 |
| 2018/0310202 | A1 | 10/2018 | Löhr et al. | |
| 2018/0324641 | A1* | 11/2018 | Tsai | H04L 69/321 |
| 2018/0368132 | A1* | 12/2018 | Babaei | H04L 1/1819 |
| 2019/0098533 | A1 | 3/2019 | Babaei et al. | |

(Continued)

FOREIGN PATENT DOCUMENTS

WO  2018/204828 A1  11/2018

OTHER PUBLICATIONS

Extended European Search Report received for corresponding European Patent Application No. 20182491.9, dated Dec. 10, 2020, 8 pages.

(Continued)

*Primary Examiner* — Gerald A Smarth
(74) *Attorney, Agent, or Firm* — Nokia Technologies Oy (57) ABSTRACT

In accordance with an example embodiment of the present invention, a method comprising: receiving, by a user equipment and from a network node, an indication of at least one subset and information comprising parameters for configuring a plurality of radio link control (RLC) entities for data duplication for a radio bearer and mapping at least one configured RLC entity of the plurality of RLC entities to the at least one subset; and based on the information and at least one criterion, determining an activation status of the at least one configured RLC entity in the at least one subset.

20 Claims, 6 Drawing Sheets

(56) References Cited

U.S. PATENT DOCUMENTS

2019/0254117 A1\* 8/2019 Chen .................. H04W 28/06
2020/0344723 A1\* 10/2020 Babaei ................ H04L 1/1874

OTHER PUBLICATIONS

"Enhancements for Increasing PDCP Duplication Efficiency", 3GPP TSG-RAN WG2 Meeting #105, R2-1901040, Agenda : 11.7.4, ASUSTeK, Feb. 25-Mar. 1, 2019, 3 pages.
"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.
"New WID: Support of NR Industrial Internet of Things (IoT)", 3GPP TSG RAN Meeting #83, RP-190728, Agenda : 9.1.2, Nokia, Mar. 18-21, 2019, 6 pages.
"3rd Generation Partnership Project; Technical Specification Group Radio Access Network; NR; NR and NG-RAN Overall Description; Stage 2 (Release 15)", 3GPP TS 38.300, V15.6.0, Jun. 2019, pp. 1-99.
"Leg selection for UL PDCP duplication transmission", 3GPP TSG-RAN WG2 Meeting #106, R2-1905690, Agenda : 11.7.4, Spreadtrum Communications, May 13-17, 2019, 3 pages.
"Selection of PDCP duplication legs via gNB-control", 3GPP TSG-RAN WG2 Meeting #106, R2-1905764, Agenda : 11.7.4, vivo, May 13-17, 2019, 2 pages.
"Dynamic Adaptation of Uplink PDCP Duplication", 3GPP TSG-RAN WG2 Meeting #106, R2-1906190, Agenda : 11.7.4, Nokia, May 13-17, 2019, 4 pages.
"UE-based criteria for the cell or leg selection of PDCP duplication", 3GPP TSG-RAN WG2 Meeting #106, R2-1905767, Agenda : 11.7.4, vivo, May 13-17, 2019, 2 pages.

\* cited by examiner

FLEXIBLE NETWORK CONTROL OF UPLINK DATA DUPLICATION

TECHNICAL FIELD

The teachings in accordance with the exemplary embodiments of this invention relate generally to mechanisms to enable control balancing and reliability of communication signalling and, more specifically, relate to a control mechanisms using network information, dynamic messaging, and/or UE controlled subsets for indicating modification, validity, and/or radio bearer(s) associated with activation of subsets for use in PDCP duplication.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
BSR: Buffered Status Report
CA: Carrier Aggregation
CE: Control Elements
DC: Dual Connectivity
DCI: Downlink Control Information
DRB: Data Radio Bearer
SRB: Signalling Radio Bearer
gNB: 5G NodeB
HARQ: Hybrid Automatic Repeat Request
IIoT: Industrial Internet-of-Things
L2 Layer-2
L3: Layer-3
LCH: Logical Channel
LCID: Logical Channel Identifier
LCP: Logical Channel Prioritization
MAC: Medium Access Control
MCS: Modulation and Coding Scheme
NR: New Radio
PDCP: Packet Data Convergence Protocol
PDU: Protocol Data Unit
PHY: Physical Layer
PUSCH: Physical Uplink Shared Channel
QFI: QoS Flow Identifier
QoS: Quality-of-Service
RAN: Radio Access Networks
RLC: Radio Link Control
RRC: Radio Resource Control
SCS: SubCarrier Spacing
SDAP: Service Data Adaptation Protocol
SDU: Service Data Unit
SI: Study Item
SR: Scheduling Request
TBS: Transport Block Size
THR: Threshold
TTI: Transmission Time Interval
TX: Transmission
UE: User Equipment
UL: Uplink
UPF: User Plane Function
URLLC: Ultra-Reliable Low-Latency Communications Current standards implementations for communication networks including 5G and new radio (NR) network standards are using ultra-reliable low latency communications (URLLC) services.

Ultra-Reliable Low Latency Communications (URLLC) is a key feature of current networks, including 5G, and enables these networks to support emerging applications in different verticals beyond conventional telecommunication services. The targeted use cases of URLLC include various delay-sensitive applications such as tactile internet, autonomous driving, and smart factories/industrial automation.

Example embodiments of the invention as described herein work to improve on at least these operations as stated above.

SUMMARY

Various aspects of examples of the invention are set out in the claims.

According to a first aspect of the present invention, a method comprising: receiving, by a user equipment and from a network node, an indication of at least one subset and information comprising parameters for configuring a plurality of radio link control (RLC) entities for data duplication for a radio bearer and mapping at least one configured RLC entity of the plurality of RLC entities to the at least one subset; and determining, based on the information and at least one criterion, an activation status of the at least one configured RLC entity in the at least one subset.

According to a second aspect of the present invention, an apparatus comprising: at least one processor; and at least one memory including computer program code, wherein the at least one memory and the computer program code are configured, with the at least one processor, to cause the apparatus to at least: receive, from a network node, an indication of at least one subset and information comprising parameters for configuring a plurality of radio link control (RLC) entities for data duplication for a radio bearer and mapping at least one configured RLC entity of the plurality of RLC entities to the at least one subset; and determine, based on the information and at least one criterion, an activation status of the at least one configured RLC entity in the at least one subset.

According to a third aspect of the present invention, A non-transitory computer storage medium encoded with a computer program, the program comprising instructions that when executed by one or more computers cause the one or more computers to perform operations comprising: receiving, by a user equipment and from a network node, an indication of at least one subset and information comprising parameters for configuring a plurality of radio link control (RLC) entities for data duplication for a radio bearer and mapping at least one configured RLC entity of the plurality of RLC entities to the at least one subset; and determining, based on the information and at least one criterion, an activation status of the at least one configured RLC entity in the at least one subset.

According to a fourth aspect of the present invention, a method comprising: determining, by a network node, an indication of at least one subset and information comprising parameters for configuring a plurality of radio link control (RLC) entities for data duplication for a radio bearer and mapping at least one configured RLC entity of the plurality of RLC entities to the at least one subset; and sending towards a user equipment, the indication of the at least one subset and the information comprising parameters, wherein the indication and the information enable the user equipment to determine an activation status of the at least one configured RLC entity in the at least one subset based on at least one criterion.

According to a fifth aspect of the present invention, an apparatus comprising: at least one processor; and at least one memory including computer program code, wherein the at least one memory and the computer program code are configured, with the at least one processor, to cause the apparatus to at least: determine an indication of at least one subset and information comprising parameters for configuring a plurality of radio link control (RLC) entities for data duplication for a radio bearer and mapping at least one configured RLC entity of the plurality of RLC entities to the at least one subset; and send towards a user equipment, the indication of the at least one subset and the information comprising parameters, wherein the indication and the information enable the user equipment to determine an activation status of the at least one configured RLC entity in the at least one subset based on at least one criterion.

According to a sixth aspect of the present invention, A non-transitory computer storage medium encoded with a computer program, the program comprising instructions that when executed by one or more computers cause the one or more computers to perform operations comprising: determining, by a network node, an indication of at least one subset and information comprising parameters for configuring a plurality of radio link control (RLC) entities for data duplication for a radio bearer and mapping at least one configured RLC entity of the plurality of RLC entities to the at least one subset; and sending towards a user equipment, the indication of the at least one subset and the information comprising parameters, wherein the indication and the information enable the user equipment to determine an activation status of the at least one configured RLC entity in the at least one subset based on at least one criterion.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of this invention, there is proposed method that can be used by an apparatus at least to provide information of network and/or UE controlled subsets that can be subsets of RLC entities and/or subsets of duplication legs. The information to provide dynamic messaging for indicating modification, validity, and/or radio bearer(s) associated with activation of subsets for at least use in PDCP duplication.

As similarly stated above, Ultra-Reliable Low Latency Communications (URLLC) is a key feature of 5G that enables it to support emerging applications in different verticals beyond conventional telecommunication services.

The targeted use cases of URLLC include various delay-sensitive applications such as tactile internet, autonomous driving, and smart factories/industrial automation. The very first standard of 5G communications, namely the 3GPP Release-15, has introduced several enhancements across multiple radio access networks (RAN) protocol layers in a bid to meet the challenging goals of URLLC.

For instance, by utilizing the framework of carrier aggregation (CA) and dual-connectivity (DC) inherited from the previous releases, PDCP duplication has been employed in Layer-2 as an effective approach to tackle the high reliability target of URLLC (e.g. 5-nine reliability).

Figure 1A:
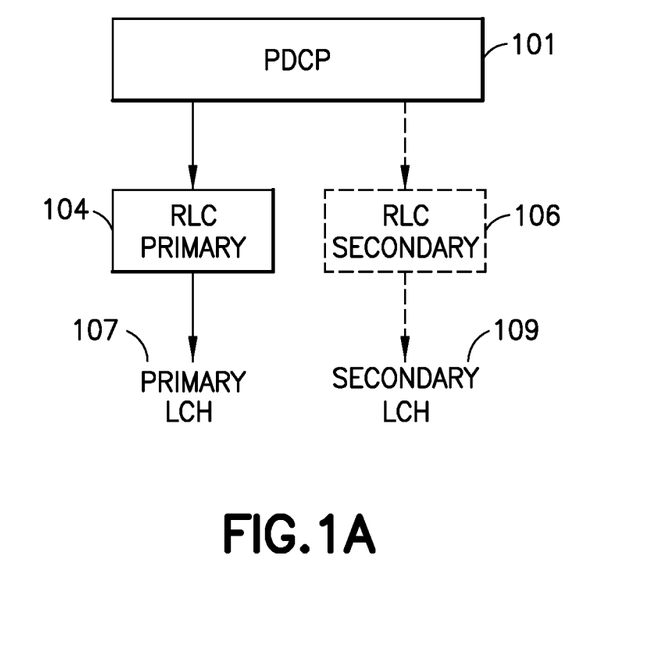
FIG. 1A shows Figure 16.1.3-1: Packet Duplication of 3GPP TS 38.300 V15.6.0 (2019-06)

In one PDCP duplication operation, when duplication is configured for a radio bearer by RRC, a secondary RLC entity is added to the radio bearer to handle the duplicated PDCP PDUs. This is depicted in FIG. 1A which shows Figure 16.1.3-1: Packet Duplication of 3GPP TS 38.300 V15.6.0 (2019-06). As shown in FIG. 1A there is a PDCP entity 101, associated with a primary logical channel 107 corresponding to the primary RLC entity 104, and a secondary logical channel 109 corresponding to the secondary RLC entity 106. The RLC entities 104 and 106 can have the same RLC mode. Duplication at PDCP therefore can consist of submitting the same PDCP PDUs twice: once to the primary RLC entity and a second time to the secondary RLC entity. With two independent transmission paths, packet duplication therefore increases reliability and reduces latency and is beneficial for URLLC services.

In PDCP duplication, the duplicated PDCP PDUs are processed and transmitted over independent paths (e.g. different component carriers in CA, or different nodes in DC) for the sake of achieving diversity. Such scheme increases the probability of successful packet delivery because when the receiver fails to decode a PDCP PDU, it can exploit the redundant version to recover the data without incurring additional retransmission delays, thereby improving both reliability and latency performance.

On the other hand, if the receiver managed to decode one of the copies successfully, the other copy of the PDCP PDU will be discarded, bringing no advantages to the communication but only a resource cost. Moreover, SA2 has further considered the concept of duplication above PDCP (i.e. outside the RAN) by allowing a UE to be concurrently connected to two or more disjoint end-to-end network paths. These paths are characterized by different PDU sessions traversing different CN and RAN nodes, and thus different air-interfaces, in order to achieve selective diversity to improve URLLC performance in an end-to-end fashion. This is referred to as higher layer duplication.

The duplication schemes described herein, including both PDCP duplication and higher layer duplication, mainly rely on selective diversity, so the receiver discards a redundant packet when its counterpart is successfully received. However, this approach may not be efficient for at least a reason that a duplicated transmission is not always needed, while it consumes considerable radio resources. Therefore, duplication should be carefully utilized, only if needed.

When configuring packet duplication for a DRB, an RRC can also set the initial state (either activated or deactivated). To save the radio resource required for uplink, an NR Rel-15 PDCP duplication in uplink (UL) can be activated/deactivated by the gNB on a per-DRB basis, with up to 2 copies for each DRB. After the configuration, this activated or deactivated state can then be dynamically controlled by means of a MAC control element and in DC, the UE applies the MAC CE commands regardless of their origin (MCG or SCG). Thus, the activation status of duplication of a DRB configured with PDCP duplication can be indicated by the network via the MAC CE command (TS 38.321). When duplication is configured for an SRB the state is always active and cannot be dynamically controlled.

Further, as it is anticipated that Rel-16 will support up to 4 copies per DRB, the control mechanism will be extended to support 4 copies/legs for a DRB. This is shown in FIG. 1B where the network (MgNB) configures 4 RLC entities for a DRB of a UE via RRC, and a MAC CE is used to select and activate at least one of these configured RLC entities for uplink data transmission.

Figure 1B:
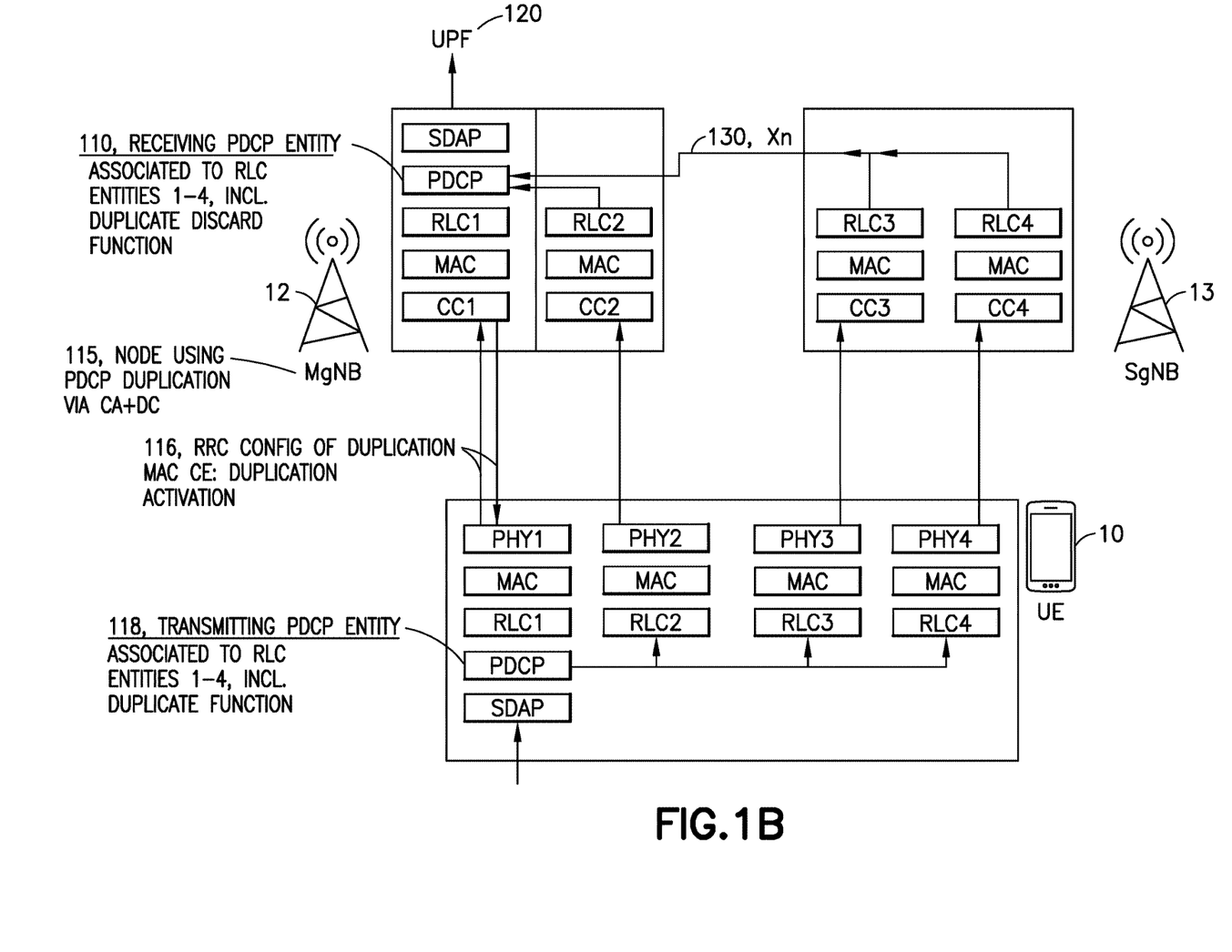
FIG. 1B shows a MAC CE activation of uplink duplication for CA+DC scenario with duplication with 4 copies.

As shown in FIG. 1B there is an MgNB 12. As per note 115 of FIG. 1B the MgNB 12 uses PDCP duplication via carrier aggregation (CA) and dual connectivity (DC). As shown in FIG. 1B the a receiving PDCP entity 110 of MgNB 12 is associated with two RLC entities in MgNB 12 (RLC1 and RLC2) and two RLC entities in SgNB 13 (RLC 3 and RLC4). Data from RLC entities RLC3 and RLC4 of SgNB 13 is sent to PDCP entity 110 of MgNB 12 via Xn interface 130. In addition, as shown in FIG. 1B the MgNb 12 is also communicating the PDCP entity 110 with the UPF 120. Further, as shown in note 116 of FIG. 1B the MgNB is communicating an RRC configuration of duplication MAC CE and duplication information with RLC entities 1-4 that are associated with the UE 110. As shown in note 118 of FIG. 1B there is transmitting including PDCP duplicate functions by a PDCP entity that is associated with RLC entities 1-4 in UE 10.

There have been discussions on needs to make the duplication (or de-activation) of UL DRBs more dynamic, up to per-packet selective duplication, to provide resource efficiency improvement. It is noted that existing proposals for resource efficiency improvement are based either on network control or on UE control of the RLC leg switching and/or activation for duplication. Note that the UE-controlled approaches are to some extent still based on network assistance, such that the network should define activation conditions or guidelines that allow the UE to make the decision. The activation conditions can be related to at least one of performance status, channel quality, and type of packet to be processed.

On one side, retaining the duplication control at the network may cause signalling overhead in case frequent adjustments of the RLC legs to use for duplication are necessary. It may also take longer for the UE to react if adaptation of RLC legs for duplication is solely relying on network control. Whereas leaving the duplication control to the UE may be deleterious as the UE may neglect important factors for determining whether duplication is needed. For instance, the interference that is affecting a radio link in the uplink, is measurable only at the network side, but not at the UE. Therefore, it would be beneficial to support a control mechanism that allows a good trade-off between network and UE control to balance signalling vs reliability performance. At least these issues are addressed by example embodiments of this invention.

Figure 5:
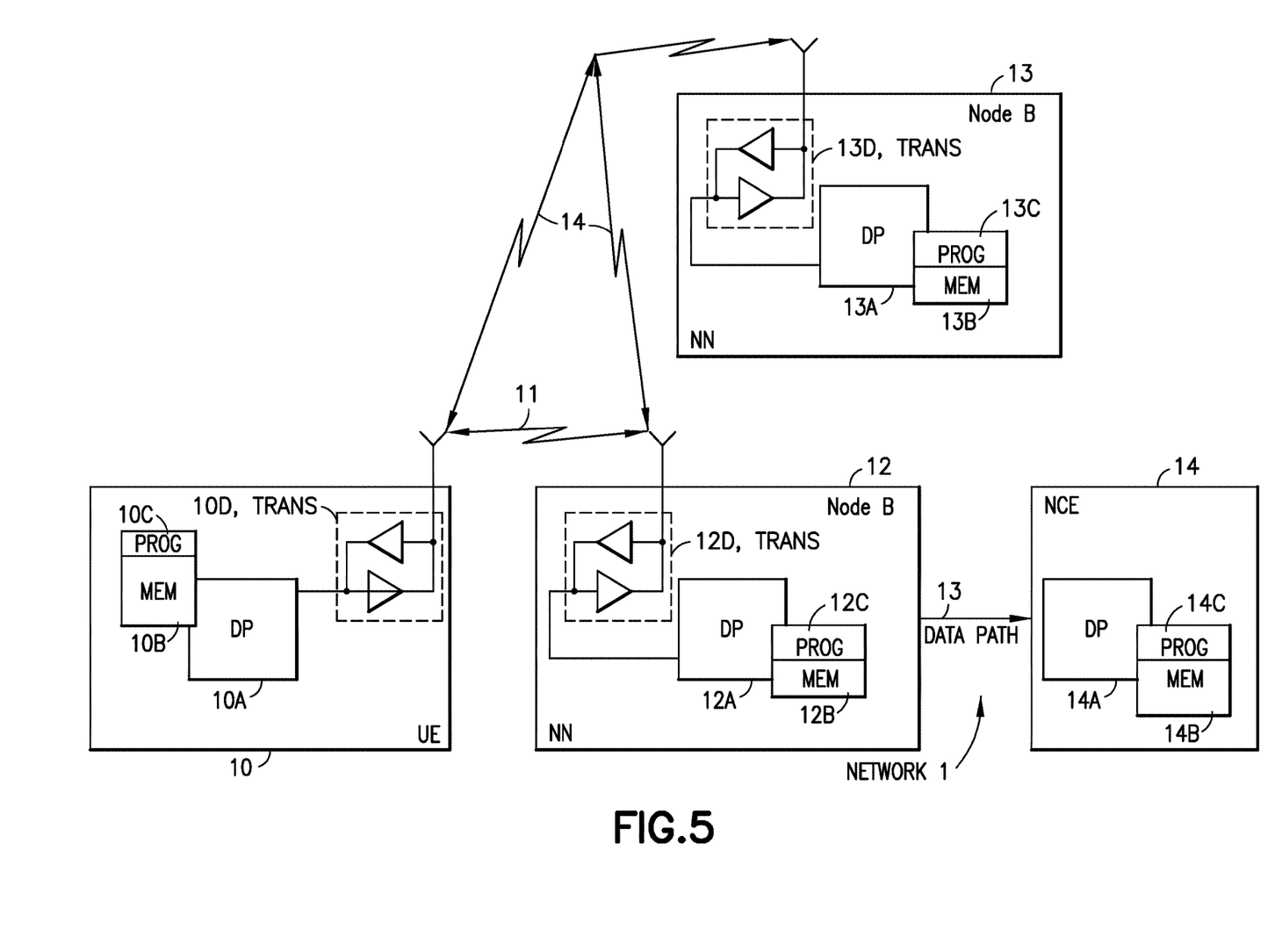
FIG. 5 shows a high level block diagram of various devices used in carrying out various aspects of the invention.

Before describing the example embodiments of the invention in further detail, reference is made to FIG. 5 for illustrating a simplified block diagram of various electronic devices that are suitable for use in practicing the example embodiments of this invention.

FIG. 5 shows a block diagram of one possible and non-limiting exemplary system in which the example embodiments of the invention may be practiced. In FIG. 5, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 111.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 5. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE 14 of FIG. 5.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE 14 of FIG. 5.

The one or more buses of the device of FIG. 5 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 5 shows a network nodes Such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE) 14 that may include MME (Mobility Management Entity)/SGW (Serving Gateway) functionality, and which provides connectivity with a further network, such as a telephone network and/or a data communications network (e.g., the Internet). The NN 12 and the NN 13 are coupled via a link 13 and/or link 14 to the NCE 14. In addition, it is noted that the operations in accordance with example embodiments of the invention, as performed by the NN 13, may also be performed at the NCE 14.

The NCE 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

In accordance with example embodiments of the invention there is proposed at least a method that can be performed such that an access node, such as a gNB can configure a network device such as a UE with parameters for a DRB configured with N legs for duplication. It is noted that the terms related to legs or RLC entities can be used interchangeably in this application and a use of one of these terms related to legs or RLC entities does not limit its use to be reflective of a use or operation described using another of these terms.

In accordance with example embodiments of the invention operations associated with the parameters for configuration of the DRB as described below. In accordance with example embodiments of the invention these parameters below may be configured after or while a subset of legs being configured for the DRB, so that the subset can be chosen among the already-configured legs for the configuration. The operations associated with these parameters include for example:

Network-controlled Leg Subset $L_{NW}$—the set of legs, which should be activated and deactivated only based on an explicit network command sent to the UE.
All legs included in this set could be considered all activated or all deactivated by default upon the reception of the configuration;
Alternatively, the activation status of each leg in this set could differ upon configuration;
The subset has size $S_{NW} \leq N$; and/or
The network is able to subsequently and/or dynamically change legs mapped to the subset.

UE-controlled Leg Subset $L_{UE}$—the set of legs for which the UE controls the activation status. The UE may activate any of these additional legs for duplication when a certain activation condition pre-configured by the network is met. Once the condition is no longer valid and/or another (deactivation) condition is met, the UE autonomously deactivates the leg.
All legs included in this set could be considered all activated or all deactivated by default upon the reception of the configuration;

Alternatively, the activation status of each leg in this set could differ upon configuration;

The subset has size $S_{UE} \leq N - S_{SW}$;

Subsequently the network is able to dynamically change legs mapped to the subset; and/or The activation condition pre-configured by the network may be relating to at least one of performance status, channel quality, and type of packet to be processed.

UE-based control allowed indication—this indicates that the UE is allowed to control the duplication activation for legs included in the UE-controlled Leg Subset; and Minimum/maximum number of additional copies $M_{UE}$ to evaluate—this indicates that the UE should evaluate the activation state for at least/maximum $M_{UE}$ legs to be potentially used for duplication if they meet the network condition(s).

$M_{UE}$ can be e.g. 1, 2, or 3 copies.

Note that the total number of active legs and the total number of copies to be sent should be equivalent.

In some cases, the two subsets above are both explicitly indicated. In some other cases, the gNB may indicate the Network-controlled Leg Subset only, along with the "UE-based control allowed indication", which implies that the remaining legs (the ones not in the Network-controlled Leg Subset out of the entire set of configured legs for this DRB) are in the UE-controlled Leg Subset.

As an alternative to the indication of the actual legs or RLC legs under the network or UE control, the gNB may indicate the leg subset size $S_{NW}/S_{UE}$ indicating the number of legs to be considered as part of the sets. In this case, the UE will rank all legs according to certain network-configured metrics (e.g. legs to be ranked in decreasing order of RSRP or RSRQ or SINR values) and activate the first $S_{NW}$ for duplication in the rank order. The activation status of the next $S_{UE}$ legs is based on their activation condition(s). Instead of the leg subset size, the gNB may indicate a "minimum number $M_{NW}/M_{UE}$ of copies". As above, the UE will activate the first $M_{NW}$ legs from the ranked legs and determine the activation state for the next $M_{UE}$ legs based on the pre-configured condition(s).

Furthermore, the gNB may indicate—along with the Subset $L_{NW}$ and/or Subset $L_{UE}$—the minimum number and/or exact number and/or maximum number of copies/legs ($M_{MIN}/M/M_{MAX}$) that the UE should at least/exactly/at most use for duplication (e.g. 1, 2, or 3 legs/copies). In one embodiment, the UE will first rank the configured legs according to the network-defined condition(s). Then, it will select $M_{MIN}/M/M_{MAX}$ legs, where the selecting comprises going through the ranked/prioritized list of legs starting from the top and activating the legs until the required number of copies for duplication can be reached. This can be, for example, achieved by performing the following pseudo-code, until the configured number of copies is reached:

UE checks whether the configured number of copies is reached ($M_{MIN}/M/M_{MAX}$)
If number of copies is not reached
For the next leg in the list
If this leg is NW-controlled: the UE activates it
If this leg is UE-controlled: the UE determines whether the pre-configured
activation condition is met, and the UE activates it only if met.
Else stop.

In situations where the UE has checked/evaluated all the legs but the total number of active legs is still fewer than $M_{MIN}/M/M_{MAX}$, the UE may choose the remaining legs arbitrarily to reach the required number of copies (e.g. based on UE-implementation, or random leg selection).

In another embodiment, the network provides the minimum number of copies which should be sent by the UE and in case the number of copies/legs activated by the network or by the UE based on the pre-defined condition is lower than the required number of copies, the UE chooses additional legs where duplicates are sent according to the leg ranking (similarly as above). There is no additional condition related to whether the copy should be sent through a selected leg. Additionally, the network may decide to divide the legs into two sets as previously, i.e. network controlled legs and UE controlled legs. The activation status in the network-controlled controlled subset is changed solely by the explicit network commands (e.g. MAC CE) and additionally the UE is tasked to perform leg ranking within UE-controlled legs subset and send additional copies to reach either the minimum number of copies configured for UE-controlled legs or an overall minimum number of copies, e.g.:

Case 1: network configures:
2 legs in NW-controlled leg subset
2 legs in UE controlled leg subset
Minimum number of copies=3

In case network activates 2 legs, then UE chooses the higher ranked leg from UE-controlled subset to reach the number of copies=3. In case the network activates one leg, UE sends copies on both of legs in the UE-controlled leg subset.

Case 2: network configures:
2 legs in NW-controlled leg subset
2 legs in UE controlled leg subset
Number of copies in UE-controlled leg subset=2

UE always duplicates on both of its legs in UE-controlled subset to meet the mandated number of copies in the UE-controlled leg subset, regardless of whether network already activates one or two of NW-controlled legs.

Any of the indications above may additionally have a time validity (e.g. controlled by a timer) and any combination of them is also considered.

Moreover, the leg subsets mentioned above could be dynamically modified by the gNB with L1/L2 control signalling, such as MAC CE or a DCI. In a special case, a MAC CE indication may be used to switch a DRB of a UE from a fully network-controlled approach (i.e. No UE-controlled Leg Subset configured by RRC) to a UE-controlled approach (by sending a UE-based control allowed indication).

This behaviour may also be implemented by allowing the network to override the activation status of the UE-controlled legs by sending a UE-based control not allowed indication at a certain time or by allowing the network to indicate the status of a leg to be one out of three states:

Duplication activated;
Duplication deactivated; or
Duplication controlled by the UE (e.g. (de-)activation of the leg is triggered by certain pre-configured activation conditions relating to at least one of performance status, channel quality, and type of packet to be processed.)

Figure 2:
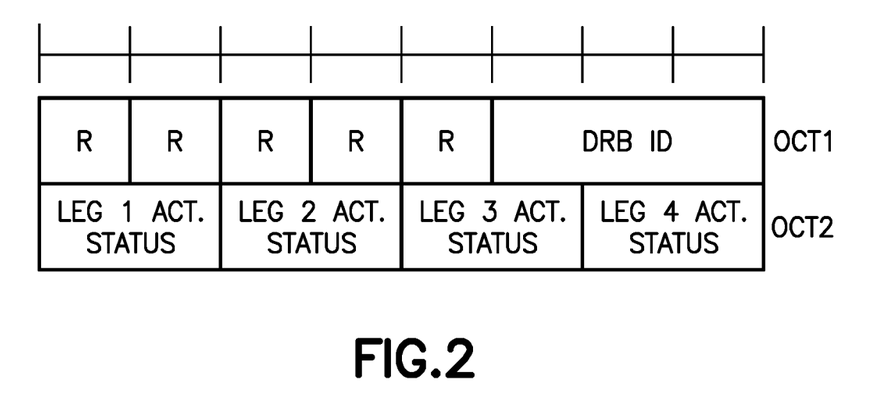
FIG. 2 shows a MAC CE in accordance with example embodiments of the invention.

An exemplary MAC CE is presented in FIG. 2, where 2 bits are used for each leg of the DRB to indicate its duplication activation status as one of the three options mentioned above. As shown in FIG. 2, MAC CE may contain, for example, DRB ID field indicating the DRB to which the MAC CE applies to. It also contains four "Leg activation status" fields, each corresponding to one of the four RLC entities which may be configured for duplication for a DRB. "Leg activation status" fields are used to indicate one of three duplication statuses for each RLC entity. When none of the legs has the state of "Duplication controlled by the UE", the MAC CE essentially nullifies the UE-controlled leg subset, and therefore all the legs can only be controlled the network.

Such dynamic signalling allows to maintain the RRC Configuration comprising the conditions for UE based activation/deactivation, while at the same time it would allow the network to override the UE control without having to send an RRC Reconfiguration.

Finally, for UE-controlled legs or RLC legs, the gNB may indicate which legs the triggering criteria of activation (e.g. relating to at least one of performance status, channel quality, and type of packet to be processed) is referring to. For instance, the UE should apply autonomous leg activation based on the status of the first leg of the Network-controlled Leg Subset or based on the RSRP/RSRQ/SINR of the second/third/ . . . leg of Network-controlled Leg Subset, or all of them.

In summary, novel features in accordance with example embodiments of this invention include at least the following configuration and signalling options:

A message from gNB indicating a Network-controlled Leg Subset and/or a UE-controlled Leg Subset for at least one DRB;

A message from gNB indicating Network-controlled/UE-controlled Leg Subset Size, Minimum/Exact/Maximum Number of Copies e.g. in total;

Dynamic signalling from gNB indicating modifications of the previously indicated leg subsets or number of copies;

A message from the gNB indicating validity condition/time of these Leg subsets, min/max number of copies, and/or modifications (e.g. a timer configuration);

A message from the gNB indicating more than one set of Leg Subsets per radio bearer, where each set of Leg Subsets is used conditioned on the PDCP PDU to be processed; and/or A message related to UE-controlled Leg Subset, which indicates the guidelines (e.g. activation conditions relating at least one of performance status, channel quality, and type of packet to be processed, and the reference legs of these activation conditions.) for the UE to determine activation/deactivation of legs in this subset.

Figure 3:
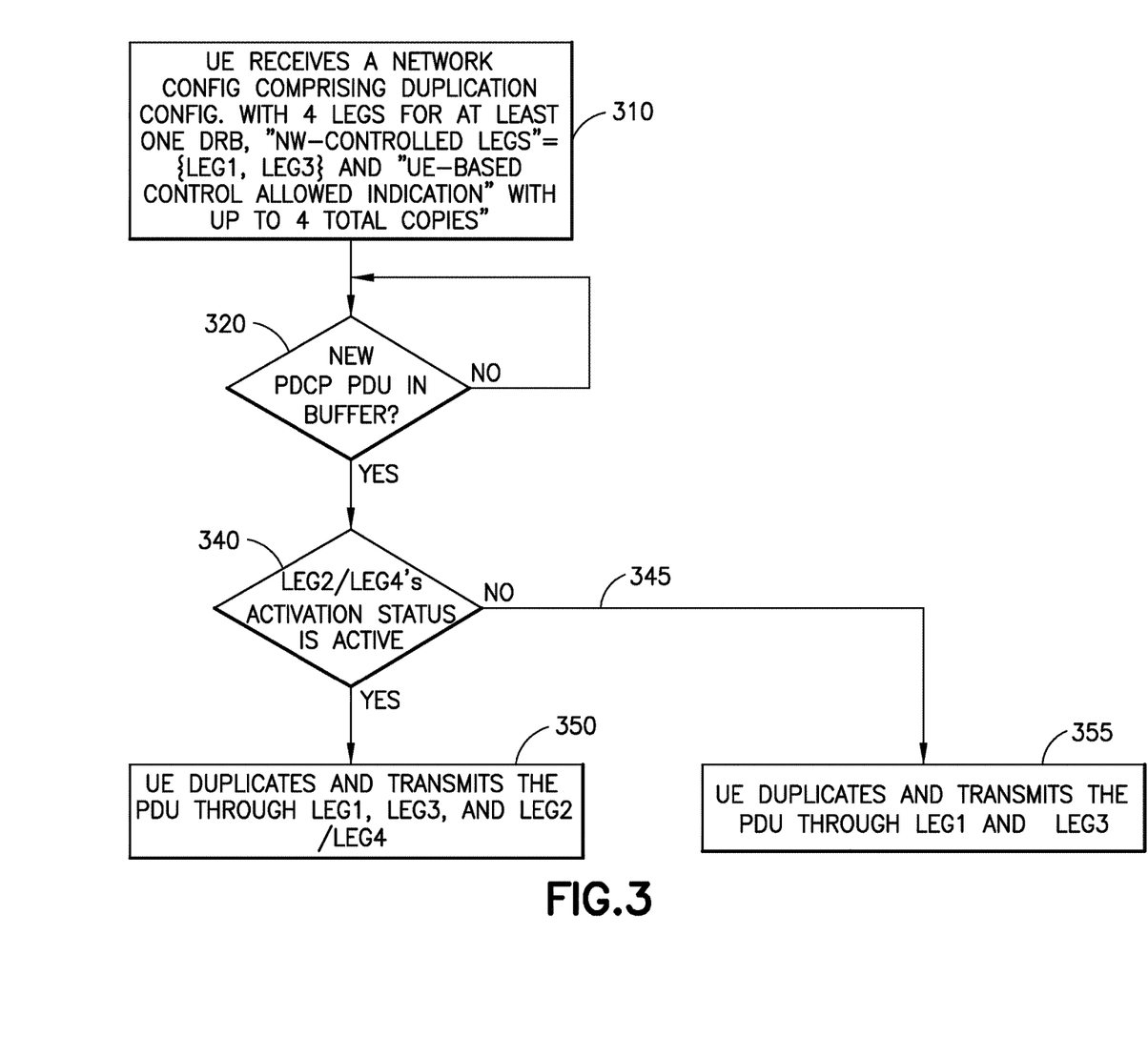
FIG. 3 shows a flow chart illustrating some example embodiments of the invention.

Details of the implementation will be explained for the scenarios of CA-based duplication with up to 4 copies/4 RLC entities. FIG. 3 shows a flow chart illustrating some example embodiments of the invention.

As shown in step 310 of FIG. 3 the UE (e.g., UE 10 as in FIG. 5) receives a network configuration comprising duplication configuration with four legs for at least one DRB. As shown in step 310 of FIG. 3 the configuration(s) show NW-controlled legs equal leg1 and leg3 (which are assumed to be active by default), and a UE based control allowed indication with up to four total copies. Then as shown in step 320 of FIG. 3 it is determined if a new PDCP PDU is in the buffer, and if so then then there is performing step 340 of FIG. 3. Else if there is determined to be no new PDCP PDU is in the buffer then the monitoring of the buffer continues. As shown in step 340 of FIG. 3 there is determining whether at least one of Leg 2 and Leg 4 is activated for duplication of this new PDPC PDU, and if there is performing step 350 of FIG. 3, wherein the copies of the new PDCP PDU are transmitted by Leg 1, Leg 3, and at least one of Leg 2 and Leg 4. Else if there is determined that none of Leg 2 and Leg 4 is to be activated, there is performing step 355 of FIG. 3 where the copies of the new PDCP PDU are transmitted by Leg 1 and Leg 3 (the NW-controlled leg subset, which is active by default) only.

In this example, the gNB (e.g., NN 12 and/or NN 13 as in FIG. 5) indicates, to a UE (e.g., UE 10 as in FIG. 5) configured with 4 legs or RLC legs (legs 1-4), the "network-controlled leg subset" to be leg 1 and leg 3 and the "optional number of copies/legs" to be 2. This implies that the UE should treat leg 2 and leg 4 as the "UE-controlled Leg Subset". Assuming the network has set the initial states of both legs (leg 1 and 3) in the "network-controlled leg subset" to be active, the UE should always use leg 1 and leg 3 for any PDCP PDU arriving on this DRB. Furthermore, it should decide whether it should additionally use any of the leg 2 and leg 4 based on certain pre-configured activation condition or criteria (e.g. relating to at least one of performance status, channel quality, and type of packet to be processed). In other words, this gives the possibility to the UE to use up to 4 copies when needed but ensures that at least 2 copies are always used for reliability.

Figure 4:
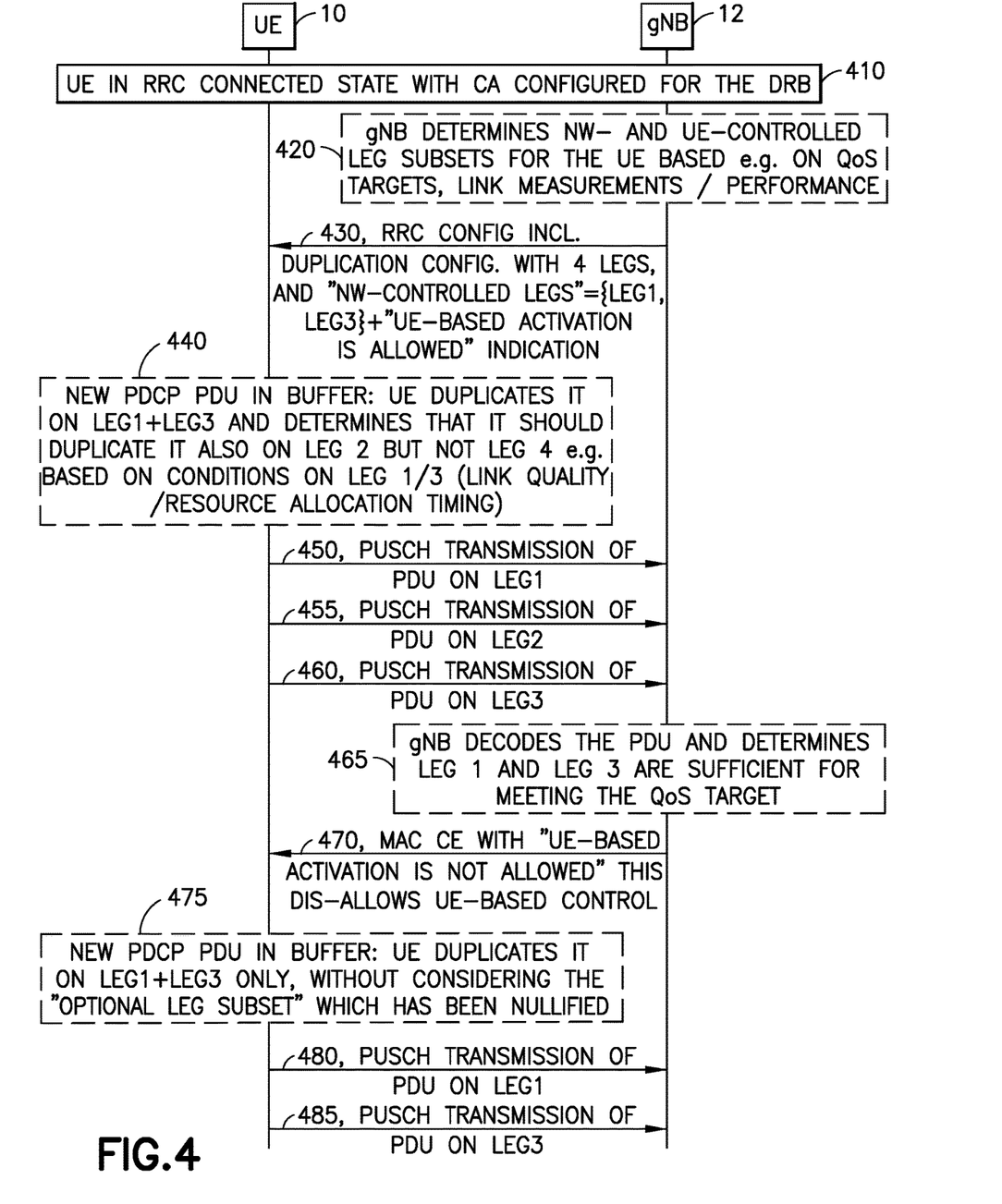
FIG. 4 shows a signalling flow diagram illustrating some example embodiments of the invention.

An exemplary message exchange flow chart between a gNB (e.g., NN 12 and/or NN13 as in FIG. 5) and a UE (e.g., UE 10 as in FIG. 5) is shown in FIG. 4 for the same case (inventive messages in accordance with some example embodiments of the invention are found in at least the steps 420, 430, 44, 465, 470, and 475 that are further numbered 2, 3, 4, 6, 7, and 8 respectively). As shown in FIG. 4 there is shown communications between a UE 10 and a gNB 12.

As shown in step 410 of FIG. 4 the UE 10 is in an RRC Connected state with the gNB 12 and with carrier aggregation (CA) configured for the DRB. Then as shown in step 420 of FIG. 4 the gNB 12 determines network (NW) and UE 10 controlled leg subsets for the UE 10 based for example on QoS target(s), link measurements, and/or link performance. As shown in step 430 of FIG. 4 the gNB 12 sends towards the UE 10 and RRC configuration including duplicate configuration for four legs, and an indication that the gNB 12 or the network controls leg 1 and leg 3 and indicating that a UE 10 based activation is also allowed on the other legs (leg 2 and leg 4). Then as shown in step 440 of FIG. 4 the UE 10 then determines that a new PDCP PDU is in its buffer and the UE 10 duplicates the PDCP PDU on leg 1 and leg 3 as per the indication of step 430. Further, as shown in step 440 of FIG. 4 the UE 10 determines that the PDCP PDU should also be duplicated on leg 2 but not on leg 4. This determining in step 440 of FIG. 4 can be based on a link quality and/or resource allocation timing associated with leg 1 and leg 3. As shown in steps 450, 455, and 460 respectively there is a PUSCH transmission by the UE 10 on legs 1, 2, and 3. As shown in step 465 of FIG. 4 the gNB 12 decodes the PDU and determines that signalling over leg 1 and leg 3 is sufficient for meeting a QoS target.

In addition, the flow chart as shown in FIG. 4 further considers the case where the gNB sends a MAC CE to modify the subset. In this example, the gNB sends a MAC CE with UE-based control is NOT allowed indication to nullify "UE-controlled Leg Subset" (Step 7), which is basically disabling the UE-controlled mechanism. This can be implemented using, for example, the MAC CE depicted in FIG. 2, where none of the legs is set to be "Duplication controlled by the UE". So, the UE should only send subsequent PDCP PDUs on leg 1 and leg 3 (NW-controlled Leg Subset) only, until further instructions.

In this regards, as shown in step 470 of FIG. 4 the gNB 12 sends towards the UE 10 a MAC CE with an indication that UE-based activation is NOT allowed, disallowing UE-based control here. Then as shown in step 475 of FIG. 4 the UE 10 determines that a new PDCP PDU is in its buffer and the UE 10 duplicates the PDCP PDU on leg 1 and leg 3 only without considering the "optional leg subset" that has been nullified based on step 470. Then as shown in steps 480 and 485, respectively, the UE 10 sends towards the gNb 12 a PUSCH transmission of PDU on leg 1 and sends towards the gNb 12 a PUSCH transmission of PDU on leg 3.

In the examples shown in FIG. 3 and FIG. 4, the legs in "network-controlled leg subset" are always active from the very beginning. Nevertheless, it must be pointed out that the network can always dynamically change the active legs in this subset.

Note that for realizing per-packet selective duplication, or UE-based activation/deactivation of PDCP duplication that are being discussed in 3GPP at this stage, the network signalling in accordance with example embodiments of this invention can indicate e.g. "Network-controlled leg subset size"=1 (or "Network-controlled leg subset"=primary leg/ leg 1), and any of other target legs to be part of the "UE-controlled leg subset". So the UE should mandatorily send a copy on the primary leg or leg 1, but it can determine whether additional copies are sent on other legs at its own discretion, e.g. using an activation condition pre-configured by the network, relating to at least one of performance status, channel quality, and type of packet to be processed.

In one additional embodiment, the configured subsets or min/max number of copies could be changed dynamically based on certain condition(s) (rather than be changed by explicit signalling from the gNB). For instance, the Network-controlled Leg Subset and UE-controlled Leg Subset could be changed in accordance to the type of PDCP PDU being processed (e.g. PDCP data PDU or PDCP control PDU). That is, depending on the PDCP PDU to be processed, the UE may apply different Network-controlled Leg Subset and UE-controlled Leg Subset to duplicate it.

In such cases, a DRB could be configured with more than one (e.g. two) pairs of Network-controlled Leg Subset and UE-controlled Leg Subset, and/or activation status, where each pair corresponds to a specific type of PDCP PDU. For example, a larger Network-controlled Leg Subset can be applied for the more important packets, where all the legs in this larger Network-controlled Leg Subset can be always active by default. Some examples of a more important packet include:

The packets corresponding to a specific QFI;
The packets which are identified as special or important, such as SDAP/PDCP Control PDU, IR-packet for header compression and I-frame of the video call;
The packets for RLC re-transmissions;
The packets during handover, etc.; and/or
The packets subsequent to a failed transmission of another packet, when survival time is considered.

In general, the proposed solution provides a generalized, unified, and flexible framework that enables different options of UE-based or network-based control of PDCP duplication, at the extent required by the situation (in terms of e.g. performance, QoS targets, UE behaviour), and thereby allows to achieve a good balance between QoS and a lean control signalling.

Figure 6A:
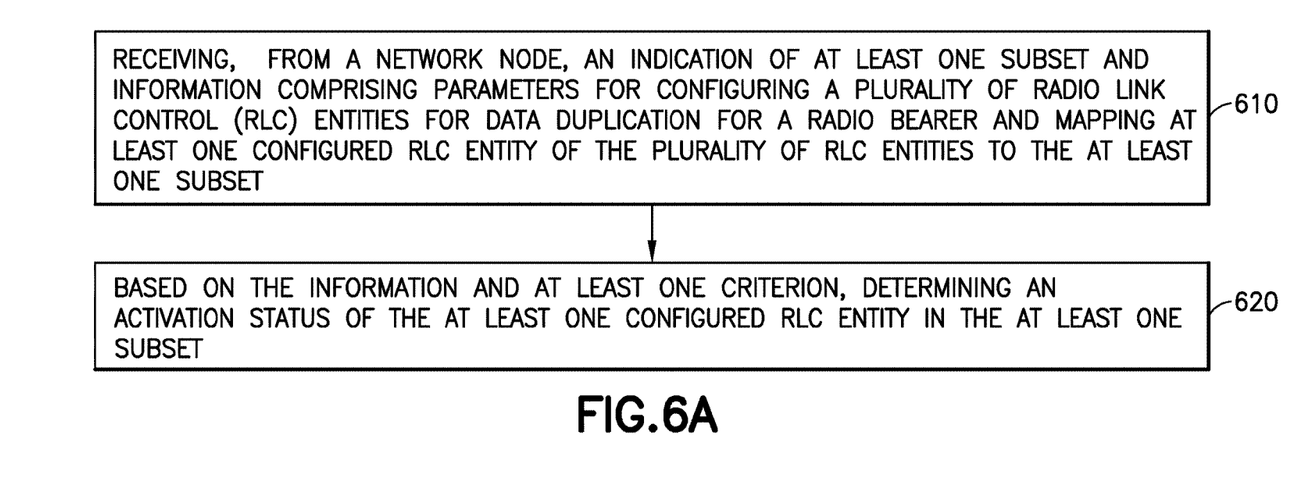
FIG. 6A and FIG. 6B each show a method in accordance with example embodiments of the invention which may be performed by an apparatus.
Figure 6B:
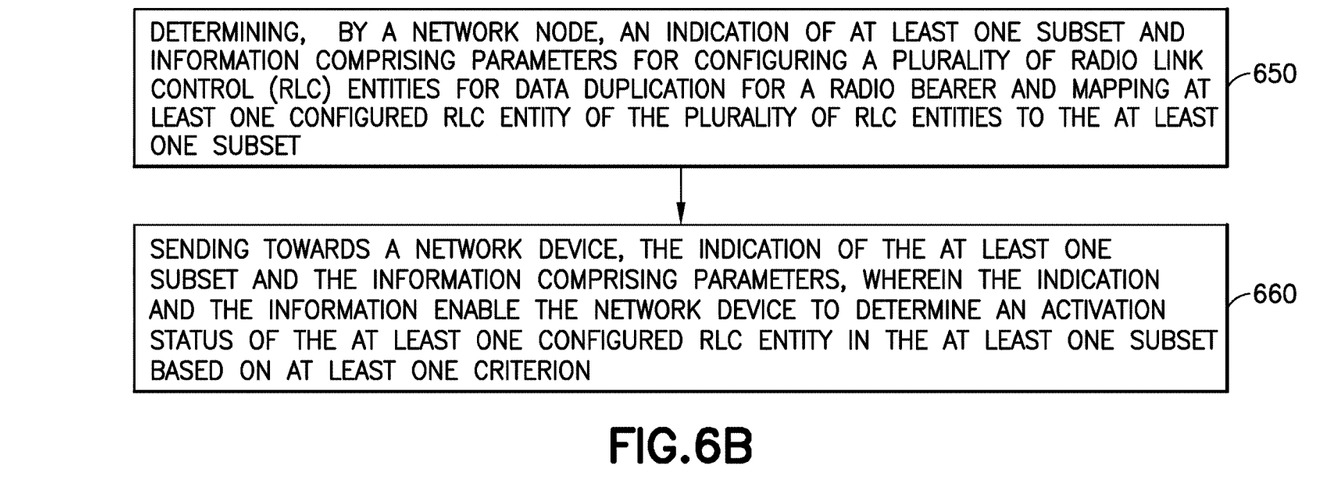

FIG. 6A and FIG. 6B each illustrate a method which may be performed by an apparatus in accordance with example embodiments of the invention as described herein.

FIG. 6A illustrates operations which may be performed by a device such as, but not limited to, a device associated with the UE 10, NN 12, and/or NN 13 as in FIG. 5. As shown in step 610 of FIG. 6A there is receiving, from a network node, an indication of at least one subset and information comprising parameters for configuring a plurality of radio link control (RLC) entities for data duplication for a radio bearer and mapping at least one configured RLC entity of the plurality of RLC entities to the at least one subset. Then as shown in step 620 of FIG. 6A there is, based on the information and at least one criterion, determining an activation status of the at least one configured RLC entity in the at least one subset.

In accordance with the example embodiments as described in the paragraph above, the at least one subset comprises a first subset and a second subset, and the method further comprising: receiving, from the network node, instructions to modify mapping of at least one configured RLC entity of the plurality of RLC entities to the at least one of the first subset and the second subset.

In accordance with the example embodiments as described in the paragraphs above, the at least one subset comprises a first subset and a second subset, and wherein a number of the configured RLC entity in at least one of the first subset or the second subset is zero.

In accordance with the example embodiments as described in the paragraphs above, wherein the indication is indicating a size of the at least one subset and a number of the at least one subset, wherein the at least one configured RLC entity is ranked for activation in a decreasing order of RSRP or RSRQ or SINR values.

In accordance with the example embodiments as described in the paragraphs above, the at least one criterion comprises a first criterion and a second criterion, and wherein the first criterion is relating to reception of at least one control signal from the network node, and the second criterion is relating to satisfaction of at least one pre-defined conditions.

In accordance with the example embodiments as described in the paragraphs above, the least one control signal from the network node is a MAC CE with indication of RLC entity activation or deactivation status.

In accordance with the example embodiments as described in the paragraphs above, the at least one pre-defined condition is relating to at least one of performance status, channel quality, and type of packet to be processed.

In accordance with the example embodiments as described in the paragraphs above, the at least one pre-defined condition is configured by the network node.

In accordance with the example embodiments as described in the paragraphs above, wherein the plurality of RLC entities comprises at least one set of legs, which should be activated and deactivated based on the indication.

In accordance with the example embodiments as described herein there is an apparatus comprising means for receiving (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), from a network node (NN 12, NN 13, and/or UE 10 as in FIG. 5), an indication of at least one subset and information comprising parameters for configuring a plurality of radio link control (RLC) entities for data duplication for a radio bearer and mapping (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5) at least one configured RLC entity of the plurality of RLC entities to the at least one subset. Further, the apparatus comprising means, based on the information and at least one criterion, for determining (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5) an activation status of the at least one configured RLC entity in the at least one subset.

In the example aspect of the invention according to the paragraph above, wherein at least the means for receiving, mapping, and determining, configuring comprises transceiver [TRANS 10D, TRANS 12D, and/or TRANS 13D as in FIG. 5] a non-transitory computer readable medium [MEM 10B, MEM 12B, and/or MEM 13B] encoded with a computer program [PROG 10C, PROG 12C, and/or PROG 13C as inn FIG. 5] executable by at least one processor [DP 10A, DP 12A, and/or DP 13A as in FIG. 5].

In accordance with the example embodiments as described herein, there is receiving, from a network node, an indication of at least one subset and information comprising parameters for configuring a plurality of radio link control (RLC) entities for data duplication for a radio bearer and mapping at least one configured RLC entity of the plurality of RLC entities to at least one subset, wherein an activation status is controlled by the network node, and an indication relating to whether an activation status of configured RLC entity not in a first subset of the at least one subset can be controlled by the network device.

In accordance with the example embodiments as described in the paragraph above, there is an apparatus to perform means for receiving (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), from a network node or network device (NN 12, NN 13, and/or UE 10 as in FIG. 5), an indication of at least one subset and information comprising parameters for configuring a plurality of radio link control (RLC) entities for data duplication for a radio bearer and mapping (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5) at least one configured RLC entity of the plurality of RLC entities to at least one subset, wherein an activation status is controlled by the network node or network device, and an indication relating to whether an activation status of configured RLC entity not in a first subset of the at least one subset can be controlled by the network node or network device.

In the example aspect of the invention according to the paragraphs above, wherein at least the means for receiving, mapping, configuring, determining, and activating comprises transceiver [TRANS 10D, TRANS 12D, and/or TRANS 13D as in FIG. 5] a non-transitory computer readable medium [MEM 10B, MEM 12B, and/or MEM 13B] encoded with a computer program [PROG 10C, PROG 12C, and/or PROG 13C as inn FIG. 5] executable by at least one processor [DP 10A, DP 12A, and/or DP 13A as in FIG. 5].

In accordance with example embodiments of the invention there is a method, conducted by a network device, comprising: receiving (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), from a network node (NN 12, NN 13, and/or UE 10 as in FIG. 5), an indication of at least one subset and information relating to a number of configured RLC entities to be activated for data duplication for a radio bearer; and determining (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), a subset of configured RLC entities based on the received information; and activating (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5) the determined subset of configured RLC entities.

In the example aspect of the invention according to the paragraphs above, wherein at least the means for receiving, determining, and activating comprises transceiver [TRANS 10D, TRANS 12D, and/or TRANS 13D as in FIG. 5] a non-transitory computer readable medium [MEM 10B, MEM 12B, and/or MEM 13B] encoded with a computer program [PROG 10C, PROG 12C, and/or PROG 13C as inn FIG. 5] executable by at least one processor [DP 10A, DP 12A, and/or DP 13A as in FIG. 5].

In accordance with the example embodiments as described herein, there is receiving, from a network node, an indication of at least one subset and information relating to a number of configured RLC entities to be activated for data duplication for a radio bearer; and determining, a subset of configured RLC entities based on the received information; and activating, the determined subset of configured RLC entities.

In accordance with the example embodiments as described in the paragraph above, the information comprises an indication of at least one of: at least one RLC entity of a number of the configured RLC entities to be considered by the network device, a minimum number of RLC entities of the configured RLC entities to be activated, a maximum number of RLC entities of the configured RLC entities to be activated, and an exact number of RLC entities of the configured RLC entities to be activated, for data duplication for the radio bearer.

In accordance with the example embodiments as described in the paragraphs above, the network device selects, according to the information relating to the number of configured RLC entities, a set of configured RLC entity to be activated based on ranking of at least one metric associating to each of the configured RLC entities.

In accordance with the example embodiments as described in the paragraphs above, the information and parameters from the network node change according to the type of data packets to be processed on the radio bearer.

In accordance with the example embodiments as described in the paragraphs above, the network device comprises a wireless device and wherein the network node comprises an access node of the communication network.

In accordance with the example embodiments as described herein there is an apparatus comprising means for receiving (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), from a network node (NN 12, NN 13, and/or UE 10 as in FIG. 5), an indication of at least one subset and information relating to a number of configured RLC entities to be activated for data duplication for a radio bearer; and determining (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), a subset of configured RLC entities based on the received information; and activating, the determined subset of configured RLC entities.

In the example aspect of the invention according to the paragraphs above, wherein at least the means for receiving and determining comprises transceiver [TRANS 10D, TRANS 12D, and/or TRANS 13D as in FIG. 5] a non-transitory computer readable medium [MEM 10B, MEM 12B, and/or MEM 13B] encoded with a computer program [PROG 10C, PROG 12C, and/or PROG 13C as inn FIG. 5] executable by at least one processor [DP 10A, DP 12A, and/or DP 13A as in FIG. 5].

FIG. 6B illustrates operations which may be performed by a device such as, but not limited to, a device associated with the UE 10, NN 12, and/or NN 13 as in FIG. 5. As shown in step 660 of FIG. 6B there is determining, by a network node, an indication of at least one subset and information comprising parameters for configuring a plurality of radio link control (RLC) entities for data duplication for a radio bearer and mapping at least one configured RLC entity of the plurality of RLC entities to the at least one subset. Then as shown in step 670 of FIG. 6B there is sending towards a network device, the indication of the at least one subset and the information comprising parameters, wherein the indication and the information enable the network device to determine an activation status of the at least one configured RLC entity in the at least one subset based on at least one criterion.

In accordance with the example embodiments as described in the paragraph above, the at least one subset comprises a first subset and a second subset, and the method further comprising: sending, by the network node, instructions to modify the configured RLC entity in the first subset, and instructions to modify the configured RLC entity in the second subset.

In accordance with the example embodiments as described in the paragraphs above, the at least one subset comprises a first subset and a second subset, and wherein the indication is indicating a size of the at least one subset and a number of the at least one subset, wherein the at least one configured RLC entity is ranked for activation in a decreasing order of RSRP or RSRQ or SINR values.

In accordance with the example embodiments as described in the paragraphs above, the at least one subset comprises a first subset and a second subset, and wherein a number of the configured RLC entity in at least one of the first subset or the second subset is zero.

In accordance with the example embodiments as described in the paragraphs above, wherein the indication is indicating a size of the at least one subset and a number of the at least one subset, wherein the at least one configured RLC entity is ranked for activation in a decreasing order of RSRP or RSRQ or SINR values.

In accordance with the example embodiments as described in the paragraphs above, the at least one criterion comprises a first criterion and a second criterion, and wherein the first criterion is relating to reception of at least one control signal from the network node, and the second criterion is relating to satisfaction of at least one pre-defined conditions.

In accordance with the example embodiments as described in the paragraphs above, the least one control signal is a MAC CE with indication of RLC entity activation or deactivation status.

In accordance with the example embodiments as described in the paragraphs above, the at least one pre-defined condition is relating to at least one of performance status, channel quality, and type of packet to be processed.

In accordance with the example embodiments as described in the paragraphs above, the at least one pre-defined condition is configured by the network node.

In accordance with the example embodiments as described herein there is an apparatus comprising means for determining (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), by a network node (NN 12, NN 13, and/or UE 10 as in FIG. 5), an indication of at least one subset and information comprising parameters for configuring a plurality of radio link control (RLC) entities for data duplication for a radio bearer and mapping at least one configured RLC entity of the plurality of RLC entities to the at least one subset. Further, means for sending (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5) towards a network device (NN 12, NN 13, and/or UE 10 as in FIG. 5), the indication of the at least one subset and the information comprising parameters, wherein the indication and the information enable the network device to determine an activation status of the at least one configured RLC entity in the at least one subset based on at least one criterion.

In the example aspect of the invention according to the paragraphs above, wherein at least the means for determining and sending comprises transceiver [TRANS 10D, TRANS 12D, and/or TRANS 13D as in FIG. 5] a non-transitory computer readable medium [MEM 10B, MEM 12B, and/or MEM 13B] encoded with a computer program [PROG 10C, PROG 12C, and/or PROG 13C as inn FIG. 5] executable by at least one processor [DP 10A, DP 12A, and/or DP 13A as in FIG. 5].

In accordance with the example embodiments as described herein there is: determining, by a network node, an indication of at least one subset and information comprising parameters for configuring a plurality of radio link control (RLC) entities for data duplication for a radio bearer and mapping at least one configured RLC entity of the plurality of RLC entities to at least one subset; and sending towards a network device the indication and the information, wherein an activation status at the network device is to be controlled by the network node, and an indication relating to whether an activation status of configured RLC entity not in a first subset of the at least one subset can be controlled by the network device.

In accordance with the example embodiments as described in the paragraph above, there is determining, by a network node, an indication of at least one subset and information relating to a number of configured RLC entities to be activated for data duplication for a radio bearer; and sending the indication and the information towards a network device, wherein the indication and the information enables the network device to determine a subset of configured RLC entities, and activate the determined subset of configured RLC entities In accordance with the example embodiments as described in the paragraphs above, the information comprises an indication of at least one of: at least one RLC entity of a number of the configured RLC entities to be considered by the network device, a minimum number of RLC entities of the configured RLC entities to be activated, a maximum number of RLC entities of the configured RLC entities to be activated, and an exact number of RLC entities of the configured RLC entities to be activated, for data duplication for the radio bearer.

In accordance with the example embodiments as described in the paragraphs above, according to the information relating to the number of configured RLC entities, there is a selected set of configured RLC entity to be activated based on ranking of at least one metric associating to each of the configured RLC entities.

In accordance with the example embodiments as described in the paragraphs above, the information and parameters change according to the type of data packets to be processed on the radio bearer.

In accordance with the example embodiments as described in the paragraphs above, the network node comprises an access node of the communication network and wherein the network device comprises a wireless device.

In accordance with the example embodiments as described herein there is an apparatus comprising means for determining (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5), by a network node (NN 12, NN 13, and/or UE 10 as in FIG. 5), an indication of at least one subset and information comprising parameters for configuring a plurality of radio link control (RLC) entities for data duplication for a radio bearer and mapping at least one configured RLC entity of the plurality of RLC entities to at least one subset; and means for sending (TRANS 10D, TRANS 12D, and/or TRANS 13D; MEM 10B, MEM 12B, and/or MEM 13B; PROG 10C, PROG 12C, and/or PROG 13C; and DP 10A, DP 12A, and/or DP 13A as in FIG. 5) towards a network device the indication and the information, wherein an activation status at the network device is to be controlled by the network node, and an indication relating to whether an activation status of configured RLC entity not in a first subset of the at least one subset can be controlled by the network device.

In the example aspect of the invention according to the paragraphs above, wherein at least the means for determining and sending comprises transceiver [TRANS 10D, TRANS 12D, and/or TRANS 13D as in FIG. 5] a non-transitory computer readable medium [MEM 10B, MEM 12B, and/or MEM 13B] encoded with a computer program [PROG 10C, PROG 12C, and/or PROG 13C as inn FIG. 5] executable by at least one processor [DP 10A, DP 12A, and/or DP 13A as in FIG. 5].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of in accordance with the example embodiments of this inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method comprising:
   receiving, by a user equipment and from a network node, an indication of at least one subset and information comprising parameters for configuring a plurality of radio link control (RLC) entities for data duplication for a radio bearer and mapping at least one configured RLC entity of the plurality of RLC entities to the at least one subset, wherein the at least one subset comprises a first subset and a second subset; and
   determining, by the user equipment based on the information and at least one criterion, an activation status of the at least one configured RLC entity in the first subset, wherein the user equipment is configured to determine an activation status of at least one RLC entity in the second subset only based on explicit commands received from the network node.

2. The method of claim 1, further comprising:
   receiving, from the network node, instructions to modify mapping of at least one configured RLC entity of the plurality of RLC entities to the at least one of the first subset and the second subset.

3. The method of claim 1, wherein the second subset comprises a primary RLC entity.

4. The method of claim 1, wherein the indication is indicating a size of the at least one subset and a number of the at least one subset, wherein the at least one configured RLC entity is ranked for activation in a decreasing order of reference-signal-received-power (RSRP) or reference-signal-received-quality (RSRQ) or signal-to-interference-plus-noise-ratio (SINR) values.

5. The method of claim 1, wherein the at least one criterion comprises a first criterion and a second criterion, and wherein the first criterion is relating to reception of at least one control signal from the network node, and the second criterion is relating to satisfaction of at least one pre-defined conditions.

6. The method of claim 5, wherein the at least one control signal from the network node is a medium access control (MAC) control element (CE) with indication of RLC entity activation or deactivation status.

7. The method of claim 5, wherein the at least one pre-defined condition is relating to at least one of performance status, channel quality, and type of packet to be processed.

8. The method of claim 5, wherein the at least one pre-defined condition is configured by the network node.

9. An apparatus comprising:
  at least one processor; and
  at least one memory including computer program code, where the at least one memory and the computer program code are configured, with the at least one processor, to cause the apparatus to at least:
  receive, from a network node, an indication of at least one subset and information comprising parameters for configuring a plurality of radio link control (RLC) entities for data duplication for a radio bearer and mapping at least one configured RLC entity of the plurality of RLC entities to the at least one subset, wherein the at least one subset comprises a first subset and a second subset; and
  determine, based on the information and at least one criterion, an activation status of the at least one configured RLC entity in the first subset, wherein the apparatus is configured to determine an activation status of at least one RLC entity in the second subset only based on explicit commands received from the network node.

10. The apparatus of claim 9, wherein the apparatus is further caused to:
  receive instructions to modify mapping of at least one configured RLC entity of the plurality of RLC entities to the at least one of the first subset and the second subset.

11. The apparatus of claim 9, wherein the second subset comprises a primary RLC entity.

12. The apparatus of claim 9, wherein the indication is indicating a size of the at least one subset and a number of the at least one subset, wherein the at least one configured RLC entity is ranked for activation in a decreasing order of reference-signal-received-power (RSRP) or reference-signal-received-quality (RSRQ) or signal-to-interference-plus-noise-ratio (SINR) values.

13. The apparatus of claim 9, wherein the at least one criterion comprises a first criterion and a second criterion, and wherein the first criterion is relating to reception of at least one control signal from the network node, and the second criterion is relating to satisfaction of at least one pre-defined conditions.

14. The apparatus of claim 13, wherein the at least one control signal from the network node is a medium access control (MAC) control element (CE) with indication of RLC entity activation or deactivation status.

15. The apparatus of claim 13, wherein the at least one pre-defined condition is relating to at least one of performance status, channel quality, and type of packet to be processed.

16. The apparatus of claim 13, wherein the at least one pre-defined condition is configured by the network node.

17. The apparatus of claim 9, wherein the plurality of RLC entities comprises legs of at least one set of legs, which should be activated and deactivated based on the indication.

18. An apparatus comprising:
  at least one processor; and
  at least one memory including computer program code, where the at least one memory and the computer program code are configured, with the at least one processor, to cause the apparatus to at least:
  determine an indication of at least one subset and information comprising parameters for configuring a plurality of radio link control (RLC) entities for data duplication for a radio bearer and mapping at least one configured RLC entity of the plurality of RLC entities to the at least one subset, wherein the at least one subset comprises a first subset and a second subset; and
  send towards a user equipment, the indication of the at least one subset and the information comprising parameters, wherein the indication and the information enable the user equipment to determine an activation status of the at least one configured RLC entity in the first subset based on at least one criterion, and enable the user equipment to determine an activation status of at least one RLC entity in the second subset only based on explicit commands received from the apparatus.

19. The apparatus of claim 18, the apparatus is further caused to:
  send instructions to modify mapping of at least one configured RLC entity of the plurality of RLC entities to the at least one of the first subset and the second subset.

20. The apparatus of claim 18, wherein the second subset comprises a primary RLC entity.

* * * * *